(12) United States Patent
Klemen

(10) Patent No.: US 7,204,780 B2
(45) Date of Patent: Apr. 17, 2007

(54) MULTI SPEED TRANSMISSION

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 139 days.

(21) Appl. No.: 11/137,621

(22) Filed: May 25, 2005

(65) Prior Publication Data

US 2006/0270516 A1    Nov. 30, 2006

(51) Int. Cl.
*F16H 3/62* (2006.01)
(52) U.S. Cl. ............... 475/279; 475/286; 475/288
(58) Field of Classification Search ........ 475/275–280, 475/286, 288, 290, 296, 311, 314
See application file for complete search history.

(56) References Cited

U.S. PATENT DOCUMENTS

| | | | | |
|---|---|---|---|---|
| 3,946,622 A | * | 3/1976 | Murakami et al. ........... | 475/276 |
| 3,956,946 A | * | 5/1976 | Murakami et al. ........... | 475/276 |
| 3,987,690 A | * | 10/1976 | Murakami et al. ........... | 475/276 |
| 4,070,927 A | | 1/1978 | Polak ........................ | 475/286 |
| 4,683,776 A | * | 8/1987 | Klemen ...................... | 475/286 |
| 4,709,594 A | | 12/1987 | Maeda ........................ | 475/280 |
| 5,106,352 A | | 4/1992 | Lepelletier ................. | 475/280 |
| 5,385,064 A | | 1/1995 | Reece ......................... | 74/331 |
| 5,497,867 A | | 3/1996 | Hirsch et al. ............. | 192/48.91 |
| 5,560,461 A | | 10/1996 | Loeffler .................... | 192/53.32 |
| 5,599,251 A | | 2/1997 | Beim et al. ................ | 475/275 |
| 5,641,045 A | | 6/1997 | Ogawa et al. .......... | 192/53.341 |
| 5,651,435 A | | 7/1997 | Perosky et al. ............. | 192/219 |
| 5,975,263 A | | 11/1999 | Forsyth .................... | 192/53.32 |
| 6,053,839 A | | 4/2000 | Baldwin et al. ............ | 475/281 |
| 6,071,208 A | | 6/2000 | Koivunen ................... | 475/275 |
| 6,083,135 A | | 7/2000 | Baldwin et al. ............ | 475/276 |
| 6,176,803 B1 | * | 1/2001 | Meyer et al. ............... | 475/286 |
| 6,217,474 B1 | | 4/2001 | Ross et al. .................. | 475/269 |
| 6,354,416 B1 | | 3/2002 | Eo ........................ | 192/53.341 |
| 6,375,592 B1 | | 4/2002 | Takahashi et al. .......... | 475/262 |
| 6,422,969 B1 | | 7/2002 | Raghavan et al. .......... | 475/276 |
| 6,425,841 B1 | | 7/2002 | Haka ......................... | 475/275 |
| 6,471,615 B1 | | 10/2002 | Naraki et al. ............... | 475/262 |
| 6,558,287 B2 | | 5/2003 | Hayabuchi et al. ......... | 475/271 |
| 6,623,397 B1 | | 9/2003 | Raghavan et al. ......... | 360/96.5 |
| 6,840,885 B2 | | 1/2005 | Yi et al. .................... | 475/276 |

FOREIGN PATENT DOCUMENTS

JP    09-126283    5/1997

* cited by examiner

*Primary Examiner*—Sherry Estremsky
*Assistant Examiner*—Edwin A. Young
(74) *Attorney, Agent, or Firm*—Dan L. Thompson

(57) ABSTRACT

A transmission is provided having four planetary gearsets, each having respective first, second, and third members, and a plurality of selectively engageable torque transmitting devices configured to selectively interconnect selected members of the four planetary gearsets for unitary rotation thereby to provide a plurality of forward speed ratios and at least one reverse speed ratio between an input member and an output member.

13 Claims, 2 Drawing Sheets

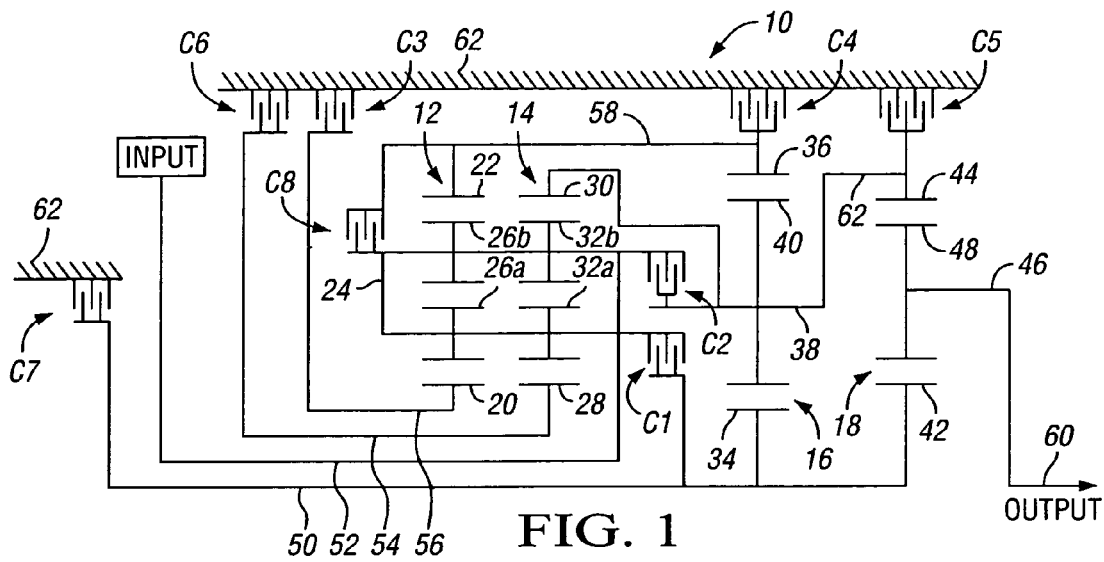
FIG. 1
| Shift Logic "A" | | | | |
|---|---|---|---|---|
| | RATIO | STEP | CLUTCHES | |
| 1 | 3.711 | | C3 | C7 |
| 2 | 2.548 | 1.457 | C6 | C7 |
| 3 | 1.924 | 1.324 | C8 | C7 |
| 4 | 1.321 | 1.457 | C2 | C7 |
| 5 | 1.000 | 1.321 | C2 | C8 |
| 6 | 0.796 | 1.256 | C2 | C3 |
| 7 OPT | 0.653 | 1.22 | C2 | C4 |
| REV | -3.625 | | C3 | C5 |
| REV2 | -1.880 | 1.9286 | C8 | C5 |
FIG. 2
| Shift Logic "B" | | | | |
|---|---|---|---|---|
| | RATIO | STEP | CLUTCHES | |
| 1 | 3.711 | | C3 | C7 |
| 2 | 2.548 | 1.46 | C6 | C7 |
| 3 | 1.929 | 1.32 | C3 | C6 |
| 4 | 1.574 | 1.23 | C1 | C6 |
| 5 | 1.334 | 1.10 | C1 | C3 |
| 6 | 1.000 | 1.33 | C1 | C2 |
| 7 | 0.796 | 1.26 | C2 | C3 |
| 8 OPT | 0.653 | 1.22 | C2 | C4 |
| REV | -3.625 | | C3 | C5 |
FIG. 3
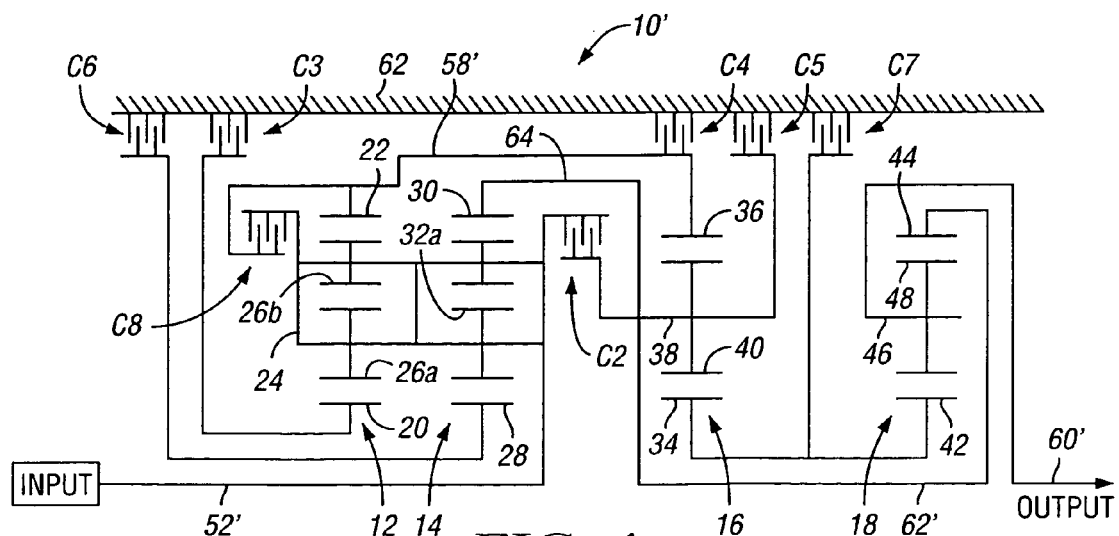
FIG. 4

| | RATIO | STEP | CLUTCHES | |
|---|---|---|---|---|
| 1 | 3.711 | | C3 | C7 |
| 2 | 2.548 | 1.46 | C6 | C7 |
| 3 | 1.924 | 1.32 | C8 | C7 |
| 4 | 1.321 | 1.46 | C2 | C7 |
| 5 | 1.000 | 1.32 | C2 | C8 |
| 6 | 0.796 | 1.26 | C2 | C3 |
| 7 OPT | 0.653 | 1.22 | C2 | C4 |
| REV | -3.625 | | C3 | C5 |
| REV2 | -1.880 | | C8 | C5 |

MULTI SPEED TRANSMISSION

TECHNICAL FIELD

This invention relates to transmissions having planetary gear arrangements.

BACKGROUND OF THE INVENTION

Passenger vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point other than the most efficient point during cruising. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-speed transmissions are disclosed in U.S. Pat. No. 6,623,397 issued to Raghavan, Bucknor and Usoro. Eight speed transmissions are disclosed in U.S. Pat. No. 6,425,841 issued to Haka. The Haka transmission utilizes three planetary gear sets and six torque transmitting devices, including two brakes and two clutches, to provide eight forward speed ratios and a reverse speed ratio. One of the planetary gear sets is positioned and operated to establish two fixed speed input members for the remaining two planetary gear sets. Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

A transmission is provided having an input member, an output member, a stationary member, and first, second, third, and fourth planetary gearsets. Each of the gearsets has respective first, second, and third members. The first member of the first planetary gearset is continuously connected to the first member of the third planetary gearset for unitary rotation. The first member of the second planetary gearset is continuously operatively connected to the second member of the third planetary gearset for unitary rotation. The second member of the first planetary gearset is continuously operatively connected to the second member of the second planetary gearset for unitary rotation. The second member of the third planetary gearset is continuously operatively connected to the first member of the fourth planetary gearset for unitary rotation. The third member of the third planetary gearset is continuously operatively connected to the third member of the fourth planetary gearset for unitary rotation. The second member of the first planetary gearset is continuously operatively connected to the input member for unitary rotation. The second member of the fourth planetary gearset is continuously operatively connected to the output member for unitary rotation.

First, second, third, fourth, fifth, and sixth torque transmitting devices are operative to selectively connect members of the planetary gearsets with the input member, the stationary member, or with other members of the planetary gearsets. The transmission thus described enables at least six forward speed ratios and two reverse speed ratios according to one torque transmitting device engagement sequence, and seven forward speed ratios and one reverse speed ratio according to another torque transmitting device engagement sequence. The transmission provided enables low internal loading, slow internal speeds, and only one overdrive in the arrangement for transversely mounted engines.

In an exemplary embodiment, the first torque transmitting device is configured to selectively couple the second member of the first planetary gearset and the second member of the second planetary gearset with the second member of the third planetary gearset for unitary rotation. The second torque transmitting device is configured to selectively couple the third member of the first planetary gearset with the stationary member. The third torque transmitting device is configured to selectively couple the first member of the fourth planetary gearset with the stationary member. The fourth torque transmitting device is configured to selectively couple the third member of the second planetary gearset with the stationary member. The fifth torque transmitting device is configured to selectively couple the third member of the third planetary gearset and the third member of the fourth planetary gearset with the stationary member. The sixth torque transmitting device is configured to selectively couple the second member of the first planetary gearsert and the second member of the second planetary gearset with a member of the third planetary gearset for unitary rotation.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic representation of a planetary transmission in accordance with the present invention;

FIG. 2 is a ratio chart and truth table depicting a first shift logic for use with the transmission of FIG. 1;

FIG. 3 is a ratio chart and truth table depicting a second shift logic for use with the transmission of FIG. 1;

FIG. 4 is a schematic representation of a second embodiment of a planetary transmission in accordance with the present invention;

DESCRIPTION OF THE PREFERRED EMBODIMENTS

Figures 5, 6:
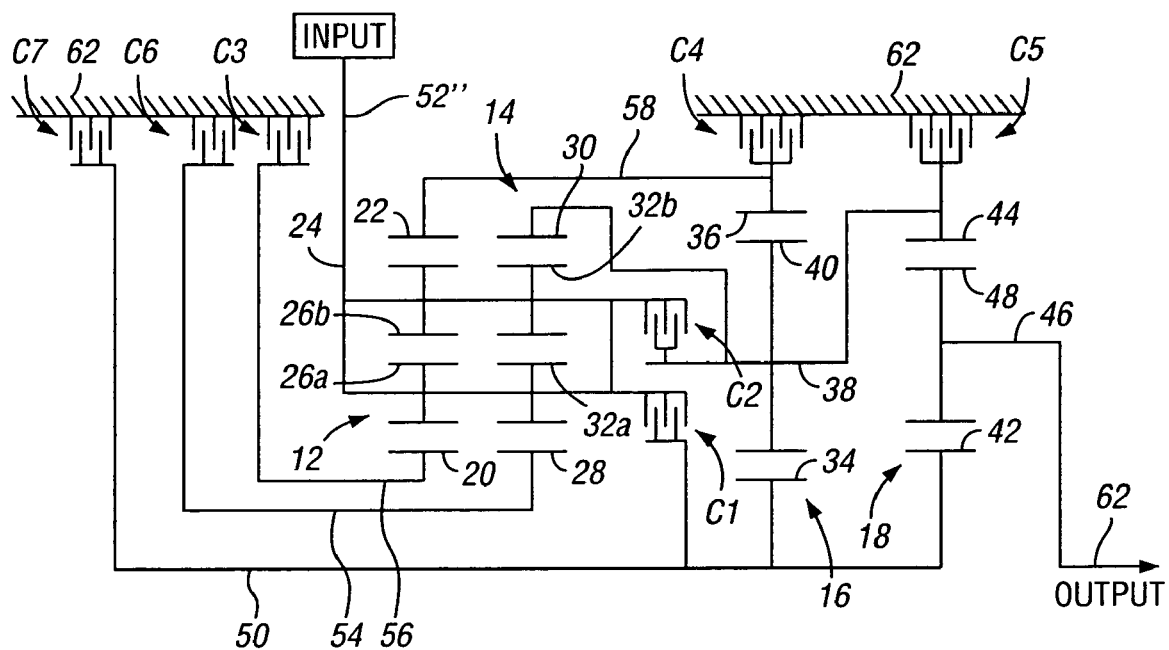
FIG. 5 is a ratio chart and truth table depicting a shift logic for use with the transmission of FIG. 4.
FIG. 6 is a schematic representation of a third embodiment of a planetary transmission in accordance with the present invention.

Referring to FIG. 1, a vehicle transmission 10 is schematically depicted. The transmission 10 includes four planetary gear sets 12, 14, 16, 18. Each of the planetary gear sets includes respective first, second and third members. More specifically, planetary gear set 12 includes sun gear member 20, ring gear member 22 and planet carrier assembly member 24. Planetary gearset 12 is compound and thus planet carrier assembly member 24 rotatably supports a first set of planet gear members 26a, which meshingly engage sun gear member 20. Planet carrier assembly member 24 also rotatably supports a second set of planet gears 26b, which meshingly engage the first set of planet gears 26a and ring gear member 22.

Planetary gear set 14 includes sun gear member 28, ring gear member 30, and planet carrier assembly member 24. Planet carrier assembly member 24 is common to both planetary gear sets 12 and 14, and thus the planet carrier assembly member of the first planetary gearset 12 is connected to the planet carrier assembly member of the second planetary gearset 14 for unitary rotation. Alternatively, and within the scope of the claimed invention, planetary gearsets 12, 14 may include individual planet carriers that are interconnected for unitary rotation. Planet carrier assembly member 24 rotatably supports a first set of planet gear members 32a, which meshingly engage sun gear member 28, and a second set of planet gear members 32b, which meshingly engage the first set of planet gear members 32a and ring gear member 30.

Planetary gear set 16 includes sun gear member 34, ring gear member 36 and planet carrier assembly member 38. Planet carrier assembly member 38 rotatably supports planet gears 40, which meshingly engage sun gear member 34 and ring gear member 36. Planetary gear set 18 includes sun gear member 42, ring gear member 44, and planet carrier assembly member 46. Planet carrier assembly member 46 rotatably supports planet gears 48, which meshingly engage sun gear member 42 and ring gear member 44.

Sun gear member 34 and sun gear member 42 are continuously operatively connected for unitary rotation by an interconnecting member such as shaft 50. Sleeve 52, which is the transmission input member, is connected to planet carrier assembly member 24 for unitary rotation therewith. Input member 52 is connectable to the output member of an engine (not shown), such as a crankshaft, either directly or through a torque converter (not shown). Sleeve 54, which is located radially outward from sleeve 52, is connected to sun gear member 28 for rotation therewith. Sleeve 56, which is radially outward from sleeve 54, is connected to sun gear member 20 for rotation therewith. Interconnecting member 58 operatively connects ring gear member 36 and ring gear member 22 for unitary rotation. Ring gear member 30 is connected to planet carrier assembly member 38 for unitary rotation therewith. Planet carrier 38 is connected to the ring gear member 44 via sleeve 62 for unitary rotation. The transmission 10 includes an output member, such as output shaft 60. Output shaft 60 is connected to planet carrier assembly member 46 for unitary rotation therewith. Output shaft 60 is connectable to a vehicle final drive system to drive vehicle wheels or other tractive device.

It should be noted that, where used in the claims, first, second, and third members of planetary gearsets do not necessarily refer to a member of a particular type; thus, for example, a first member may be any one of a ring gear member, sun gear member, or planet carrier assembly member. Similarly, as used in the claims, the respective first, second, or third members of two or more gearsets may or may not be the same type of member.

The transmission 10 includes a plurality of selectively engagable torque-transmitting devices, or clutches, C1–C8. Clutch C1 is selectively engageble to interconnect the planet carrier assembly member 24 and the input member 52 with shaft 50 and sun gear members 34, 42 for unitary rotation. Clutch C2 is selectively engageable to interconnect planet carrier assembly member 24 and input member 52 with planet carrier assembly member 38 for unitary rotation. Planet carrier assembly member 38 is connected to ring gear member 44 for unitary rotation therewith by interconnecting member 62. Thus engagement of clutch C2 further causes the interconnection of ring gear member 44 with planet carrier assembly member 24 and input member 52 for unitary rotation. Clutch C3 is a brake which is selectively engageable to ground sleeve 56 and sun gear member 20 to a stationary member such as housing 62. Clutch C4 is a brake that is selectively engageable to ground interconnecting member 58, ring gear member 22, and ring gear member 36 to housing 62. Clutch C5 is a brake that is selectively engageable to ground ring gear member 44 and planet carrier assembly member 38 to housing 62. Clutch C6 is a brake that is selectively engageable to ground sleeve 54 and sun gear member 28 to housing 62. Clutch C7 is a brake that is selectively engageable to ground shaft 50, sun gear member 34 and sun gear member 42 to housing 62. Clutch C8 is selectively engageable to connect member 58, ring gear member 22, and ring gear member 36 with planet carrier assembly member 24 and input member 52 for unitary rotation.

Sun gear member 20 preferably has 39 teeth, ring gear member 22 preferably has 81 teeth, sun gear member 28 preferably has 39 teeth, ring gear member 30 preferably has 81 teeth, sun gear member 34 preferably has 37 teeth, ring gear member 36 preferably has 81 teeth, sun gear member 42 preferably has 26 teeth and ring gear member 44 preferably has 81 teeth.

Transmission 10 is characterized by two optimal shift logic sequences. FIG. 2 depicts a first optimal shift logic sequence "A" to achieve seven forward speed ratios and two reverse ratios between the input member 52 and the output member 60. Referring to FIGS. 1 and 2, a first speed ratio is achieved when clutches C3 and C7 are engaged and when C1, C2, C4–C6, and C8 are disengaged. A second speed ratio is achieved when clutches C6 and C7 are engaged and clutches C1–C5 and C8 are disengaged. A third speed ratio is achieved when clutches C8 and C7 are engaged and when clutches C1–C6 are disengaged. A fourth speed ratio is achieved when clutches C2 and C7 are engaged and clutches C1, C3–C6, and C8 are disengaged. A fifth speed ratio is achieved when clutches C2 and C8 are engaged, and clutches C1, C3–C7 are disengaged. A sixth speed ratio is achieved when clutches C2 and C3 are engaged and when clutches C1, and C4–C8 are disengaged. A seventh speed ratio is achieved when clutches C2 and C4 are engaged and when clutches C1, C3, and C5–C8 are disengaged. A first reverse speed ratio is achieved when clutches C3 and C5 are engaged and when clutches C1, C2, C4, and C6–C8 are disengaged. A second reverse speed ratio is achieved when clutches C8 and C5 are engaged and when clutches C1–C4, and C6–C7 are disengaged. The first shift logic sequence, i.e., shift logic A, as shown in FIG. 2 is usable for transverse or rear drive. It should be noted that clutch C1 is not employed in shift logic "A."

Referring to FIGS. 1 and 3, the second shift logic sequence "B" is depicted. Using shift logic B, a first speed ratio is achieved when clutches C3 and C7 are engaged and when clutches C1, C2, C4–C6, and C8 are disengaged. A second speed ratio is achieved when clutches C6 and C7 are engaged and when clutches C1–C5 and C8 are disengaged. A third speed ratio is achieved when clutches C3 and C6 are engaged and when clutches C1, C2, C4, C5, C7, and C8 are disengaged. A fourth speed ratio is achieved when clutches C1 and C6 are engaged and when clutches C2–C5, and C7–C8 are disengaged. A fifth speed ratio is achieved when clutches C1 and C3 are engaged and when clutches C2, and C4–C8 are disengaged. A sixth speed ratio is achieved when clutches C1 and C2 are engaged and when clutches C3–C8 are disengaged. A seventh speed ratio is achieved with clutches C2 and C3 are engaged and when clutches C1, and C4–C8 are disengaged. An eighth speed ratio is achieved when clutches C2 and C4 are engaged and when clutches C1, C3, and C5–C8 are disengaged. A reverse ratio is achieved when clutches C3 and C5 are engaged and when clutches C1, C2, C4, and C6–C8 are disengaged. Referring again to FIG. 2, is should be noted that by omitting clutch C4, six speed ratios are achievable, i.e., speed ratios 1–6. Referring again to FIG. 3, it should be noted that clutch C8 is not employed in shift logic "B." Further, clutch C4 may be omitted whereby seven speed ratios are achieved in shift logic "B," i.e., speed ratios 1–7.

Referring to FIG. 4, wherein like reference numbers refer to like components from FIG. 1, an alternative transmission 10' for use with transverse or rear drive is schematically depicted. Transmission 10' is similar to the transmission 10 of FIG. 1, except the arrangement of planetary gearset 16 has been modified to move clutch C7 between planetary gearsets 16 and 18 so the input member 52' can be located in line with the output member 60'. Clutch C1 is eliminated. Input member 52' is a shaft that is coextensive with the centerline of the transmission 10' and the axis of rotation. Interconnecting member 64 operatively connects ring gear member 30 with planet carrier assembly member 38 and sun gear member 44 for unitary rotation. Interconnecting member 62' is a shaft that is coextensive with the centerline of the transmission 10' and interconnects ring gear member 44 and planet carrier 38. FIG. 5 depicts a shift logic sequence identical to shift logic sequence A of FIG. 1 that is preferably employed with transmission 10', but with different speed ratios achieved. Because of the absence of clutch C1 in transmission 10', shift logic B as shown in FIG. 3 is not usable in transmission 10'. Transmission 10' is characterized by low sun gear loading, which allows for fine pitch helical gearing, uniform ratio steps, reduced clutch torques, which improves frictional spin losses, and planet and carrier speeds that are conducive to high-speed engines.

Referring to FIG. 6, wherein like reference numbers refer to like components from FIGS. 1 and 4, another alternative transmission 10" is schematically depicted. Transmission 10" is similar to transmission 10 of FIG. 1, except that the input member 52" extends between clutch C3 and planet carrier assembly member 24, which results in the removal of clutch C8. With the absence of clutch C8, shift logic sequence "B" of FIG. 2 is preferably employed with transmission 10".

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member; an output member; a stationary member;
   first, second, third, and fourth planetary gearsets each having respective first, second, and third members;
   said first member of said first planetary gearset being continuously operatively connected to said first member of said third planetary gearset for unitary rotation;
   said first member of said second planetary gearset being continuously operatively connected to said second member of said third planetary gearset for unitary rotation;
   said second member of said first planetary gearset being continuously operatively connected to said second member of said second planetary gearset for unitary rotation;
   said second member of said third planetary gearset being continuously operatively connected to said first member of said fourth planetary gearset for unitary rotation;
   said third member of said third planetary gearset being continuously operatively connected to said third member of said fourth planetary gearset for unitary rotation;
   said second member of said first planetary gearset being continuously operatively connected to said input member for unitary rotation; said second member of said fourth planetary gearset being continuously connected to said output member for unitary rotation; and
   first, second, third, fourth, fifth, and sixth torque transmitting devices operative to selectively connect members of said planetary gearsets with said input member, said stationary member, or with other members of said planetary gearsets to provide at least six forward speed ratios.

2. The transmission of claim 1, wherein said first torque transmitting device is configured to selectively couple said second member of said first planetary gearset and said second member of said second planetary gearset with said second member of said third planetary gearset for unitary rotation;
   wherein said second torque transmitting device is configured to selectively couple said third member of said first planetary gearset with said stationary member;
   wherein said third torque transmitting device is configured to selectively couple said first member of said fourth planetary gearset with said stationary member;
   wherein said fourth torque transmitting device is configured to selectively couple said third member of said second planetary gearset with said stationary member;
   wherein said fifth torque transmitting device is configured to selectively couple said third member of said third planetary gearset and said third member of said fourth planetary gearset with said stationary member; and
   wherein said sixth torque transmitting device is configured to selectively couple said second member of said first planetary gearset and said second member of said second planetary gearset with a member of the third planetary gearset for unitary rotation.

3. The transmission of claim 2, wherein said sixth torque transmitting device is configured to selectively couple said second member of said first planetary gearset and said second member of said second planetary gearset with said third member of said third planetary gearset and said third member of said fourth planetary gearset for unitary rotation.

4. The transmission of claim 2, further comprising a seventh torque transmitting device being configured to selectively couple said first member of said third planetary gearset with said stationary member.

5. The transmission of claim 2, wherein said sixth torque transmitting device is configured to selectively couple said second member of said first planetary gearset and said second member of said second planetary gearset with said first member of said first planetary gearset for unitary rotation.

6. The transmission of claim 2, wherein said sixth torque transmitting device is configured to selectively couple said second member of said first planetary gearset and said second member of said second planetary gearset with said third member of said third planetary gearset and said third member of said fourth planetary gearset for unitary rotation; and
wherein the transmission further comprises a seventh torque transmitting device being configured to selectively couple said first member of said third planetary gearset with said stationary member; and
an eighth torque transmitting device being configured to selectively couple said second member of said first planetary gearset and said second member of said second planetary gearset with said first member of said first planetary gearset for unitary rotation.

7. A transmission comprising:
a first planetary gearset having a first ring gear member, a first planet carrier assembly member, and a first sun gear member;
a second planetary gearset having a second ring gear member, a second planet carrier assembly member, and a second sun gear member;
a third planetary gearset having a third ring gear member, a third planet carrier assembly member, and a third sun gear member;
a fourth planetary gearset having a fourth ring gear member, a fourth planet carrier assembly member, and a fourth sun gear member;
said first ring gear member being continuously operatively connected to said third ring gear member for unitary rotation; said second ring gear member being continuously operatively connected to said third planet carrier assembly member for unitary rotation; said first planet carrier assembly member being continuously operatively connected to said second planet carrier assembly member for unitary rotation; said third planet carrier assembly member being continuously operatively connected to said fourth ring gear member for unitary rotation; said third and fourth sun gear members being continuously operatively connected for unitary rotation;
an input member being continuously operatively connected to said first and second planet carrier assembly members for unitary rotation;
an output member being continuously operatively connected to said fourth planet carrier assembly member for unitary rotation;
a stationary member; and
first, second, third, fourth, fifth, and sixth torque transmitting devices operative to selectively connect members of said planetary gearsets with said input member, said stationary member, or with other members of said planetary gearsets to provide at least six forward speed ratios.

8. The transmission of claim 7, wherein said first torque transmitting device is configured to selectively couple said first and second planet carrier assembly members with said third planet carrier assembly member for unitary rotation;
wherein said second torque transmitting device is configured to selectively couple said first sun gear member with said stationary member;
wherein said third torque transmitting device is configured to selectively couple said fourth ring gear member with said stationary member;
wherein said fourth torque transmitting device is configured to selectively couple said second sun gear member with said stationary member;
wherein said fifth torque transmitting device is configured to selectively couple said third and fourth sun gears to said stationary member; and
wherein said sixth torque transmitting device is configured to selectively couple said first and second planet carrier assembly members with a member of the third planetary gearset for unitary rotation.

9. The transmission of claim 8, wherein said sixth torque transmitting device is configured to selectively couple said first and second planet carrier assembly members with said third and fourth sun gear members for unitary rotation.

10. The transmission of claim 8, further comprising a seventh torque transmitting device configured to selectively couple said third ring gear member with said stationary member.

11. The transmission of claim 8, wherein said sixth torque transmitting device is configured to selectively couple said first and second planet carrier assembly members with said first ring gear member for unitary rotation.

12. The transmission of claim 8, wherein said sixth torque transmitting device is configured to selectively couple said first and second planet carrier assembly members with said third and fourth sun gear members for unitary rotation; and
wherein the transmission further comprises a seventh torque transmitting device being configured to selectively couple said third ring gear member with said stationary member; and
an eighth torque transmitting device being configured to selectively couple said first and second planet carrier assembly members with said first ring gear member for unitary rotation.

13. A transmission comprising:
a first planetary gearset having a first ring gear member, a compound first planet carrier assembly having a first planet carrier member, and a first sun gear member;
a second planetary gearset having a second ring gear member, a compound second planet carrier assembly having a second planet carrier member, and a second sun gear member;
a third planetary gearset having a third ring gear member, a third planet carrier member, and a third sun gear member;
a fourth planetary gearset having a fourth ring gear member, a fourth planet carrier member, and a fourth sun gear member;
said first ring gear member being continuously operatively connected to said third ring gear member for unitary rotation; said second ring gear member being continuously operatively connected to said third planet carrier member for unitary rotation; said first planet carrier member being continuously operatively connected to said second planet carrier member for unitary rotation; said third planet carrier member being continuously operatively connected to said fourth ring gear member for unitary rotation; said third and fourth sun gear members being continuously operatively connected for unitary rotation;

an input member being continuously operatively connected to said first and second planet carrier members for unitary rotation;

an output member being continuously operatively connected to said fourth planet carrier member for unitary rotation;

a stationary member;

a first torque transmitting device being configured to selectively couple said first and second planet carrier members with said third planet carrier member for unitary rotation;

a second torque transmitting device being configured to selectively couple said first sun gear member with said stationary member;

a third torque transmitting device being configured to selectively couple said fourth ring gear member with said stationary member;

a fourth torque transmitting device being configured to selectively couple said second sun gear member with said stationary member;

a fifth torque transmitting device being configured to selectively couple said third and fourth sun gears to said stationary member; and a sixth torque transmitting device being configured to selectively couple said first and second planet carrier members with a member of the third planetary gearset for unitary rotation.

* * * * *